(12) United States Patent
Kurashiki et al.

(10) Patent No.: US 8,137,160 B2
(45) Date of Patent: Mar. 20, 2012

(54) GEAR MATCHING DEVICE AND GEAR MACHINING APPARATUS

(75) Inventors: Hiroyuki Kurashiki, Ritto (JP); Toshifumi Katsuma, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 311 days.

(21) Appl. No.: 12/442,457

(22) PCT Filed: Feb. 5, 2008

(86) PCT No.: PCT/JP2008/051834
§ 371 (c)(1),
(2), (4) Date: May 12, 2009

(87) PCT Pub. No.: WO2008/099714
PCT Pub. Date: Aug. 21, 2008

(65) Prior Publication Data
US 2010/0041314 A1 Feb. 18, 2010

(30) Foreign Application Priority Data
Feb. 6, 2007 (JP) ................................. 2007-026394

(51) Int. Cl.
B24B 49/00 (2012.01)
(52) U.S. Cl. ................................. 451/47; 451/10; 451/6
(58) Field of Classification Search .................... 451/10, 451/8, 47, 6, 11
See application file for complete search history.

(56) References Cited

U.S. PATENT DOCUMENTS

| | | | | |
|---|---|---|---|---|
| 5,136,522 A | * | 8/1992 | Loehrke | 700/164 |
| 5,239,782 A | * | 8/1993 | Lorenz et al. | 451/5 |
| 5,761,067 A | * | 6/1998 | Alford et al. | 700/160 |
| 6,565,418 B1 | * | 5/2003 | Feisel | 451/10 |
| 6,577,917 B1 | | 6/2003 | Ronneberger | |
| 6,752,694 B2 | * | 6/2004 | Schneegans et al. | 451/8 |
| 7,195,543 B2 | * | 3/2007 | Cousin | 451/9 |

FOREIGN PATENT DOCUMENTS

| | | |
|---|---|---|
| JP | 58-59728 A | 4/1983 |
| JP | 62-99019 A | 5/1987 |
| JP | 5-51531 U | 7/1993 |
| JP | 5-63727 U | 8/1993 |
| JP | 8-118144 A | 5/1996 |
| JP | 2004-25333 A | 1/2004 |
| JP | 2004-330397 A | 11/2004 |
| JP | 2008-110445 A | 5/2008 |

* cited by examiner

*Primary Examiner* — Dung Van Nguyen
(74) *Attorney, Agent, or Firm* — Birch, Stewart, Kolasch & Birch, LLP (57) ABSTRACT

Provided is a gear matching device which performs gear matching to establish a rotational phase relationship between a grindstone (13) and a gear-shaped workpiece (W) in which the grindstone and the workpiece can mesh with each other, before gear machining is performed by causing the grindstone and the workpiece to mesh with each other, and by then relatively rotating the grindstone and the workpiece, the gear matching device including: a tail stock (16) which is supported to be movable in the axial direction of the workpiece, and by which the workpiece is pressed against a rotary table (18) to be rotatably held, the rotary table rotating the workpiece about the axis thereof; and a sensor (33) which is provided to the tail stock, and which faces the workpiece to detect the rotational phase thereof, when the tail stock holds the workpiece.

6 Claims, 6 Drawing Sheets

GEAR MATCHING DEVICE AND GEAR MACHINING APPARATUS

BACKGROUND OF THE INVENTION

1. Field of the Invention

The present invention relates to a gear matching device which performs gear matching so as to establish a rotational phase relationship between a rotary tool and a gear to be machined in which the rotary tool and the gear can mesh with each other, and also relates to a gear machining apparatus using the gear matching device.

2. Description of the Related Art

Gear machining apparatuses, such as gear grinders and hobbing machines, have heretofore been offered as tools for machining gears by using rotary tools. In such a gear machining apparatus, a rotary tool and a gear to be machined (hereinafter referred to simply as a "gear" in the description) are synchronously controlled respectively by separate drive motors, and gear machining is then performed by causing the rotary tool and the gear to mesh with each other.

In addition, in the gear machining apparatus, a "gear matching" process is performed before the rotary tool and the gear are caused to mesh with each other. The gear matching process is performed so as to establish a rotational phase relationship between the rotary tool and the gear in which tooth tips (crests) and tooth spaces (troughs) of the rotary tool can mesh with tooth tips (crests) and tooth spaces (troughs) of the gear. In this gear matching process, the rotational phases respectively of the rotary tool and the gear are firstly detected by using a contact sensor such as a touch probe, or a non-contact sensor such as a proximity sensor. On the basis of the detection results, the offset between these rotational phases is corrected, so that the rotational phase of the rotary tool and the rotational phase of the gear are adjusted.

For example, Patent Document 1 discloses such a gear matching device. In this gear matching device, a tooth tip and a tooth space of a gear are read by using a sensor, while the rotations respectively of the rotary tool and the gear are determined. As a result, gear matching can be performed.

Patent Document 1: Japanese Patent Application Laid-open Publication No. 2004-25333

SUMMARY OF THE INVENTION

Problem to be Solved by the Invention

However, in the above-described conventional gear matching device, the sensor for detecting the rotational phase of a gear is provided on the side of a rotary tool, that is, on the side of a column for rotatably supporting the rotary tool. For this reason, the gear matching operation is complicated, thus leading to an increase in time taken for the gear matching.

Specifically, suppose a case where the gear matching operation is performed in the conventional gear matching device. When the rotational phase of a gear is detected by using a sensor, it is necessary to withdraw a rotary tool once to a position where the rotary tool does not exert an adverse effect on the detection of the sensor. Then, after the rotational phase is detected, it is necessary to move the sensor from its detecting position to its withdrawal position, and concurrently to move the rotary tool from its withdrawal position to its machining position. As a result, the time taken for the gear matching operation is increased due to the reciprocation of the rotary tool between its machining position and its withdrawal position, and also due to the reciprocation of the sensor between its detecting position and its withdrawal position.

In this respect, the present invention has been made for solving the above-described problems. An object of the present invention is to provide a gear matching device capable of shortening time taken for the gear matching, and also to provide a gear machining apparatus using the gear matching device.

Means for Solving the Problem

A first invention for solving the above-described problems provides a gear matching device which performs gear matching to establish a rotational phase relationship between a rotary tool and a gear in which the rotary tool and the gear can mesh with each other, before gear machining is performed by causing the rotary tool and the gear to mesh with each other, and by then relatively rotating the rotary tool and the gear. The gear matching device is characterized by including workpiece holding means and rotational phase detecting means. The workpiece holding means is supported to be movable in the axial direction of the gear, and presses the gear against workpiece rotating means so as to rotatably hold the gear. The workpiece rotating means rotates the gear about the axis thereof. The rotational phase detecting means is provided to the workpiece holding means, and faces the gear to detect the rotational phase thereof when the workpiece holding means holds the gear.

A second invention for solving the above-described problems provides the gear matching device according to the first invention with the following characteristics. The rotational phase detecting means is disposed on the opposite side of the gear to the rotary tool.

A third invention for solving the above-described problems provides the gear matching device according to the first invention with the following characteristics. The gear matching device further includes withdrawing means which withdraws the rotational phase detecting means from a detecting position where the rotational phase detecting means detects the rotational phase of the gear.

A fourth invention for solving the above-described problem provides the gear matching device according to any one of the first to third inventions with the following characteristics. The gear matching device further includes machining error absorbing means which absorbs a machining error in the axial direction of the gear when the workpiece holding means holds the gear.

A fifth invention for solving the above-described problems provides a gear machining apparatus characterized by including the gear matching device according to any one of the first to fourth inventions.

Effects of the Invention

The gear matching device according to the first invention performs gear matching so as to establish a rotational phase relationship between a rotary tool and a gear in which the rotary tool and the gear can mesh with each other, before gear machining is performed by causing the rotary tool and the gear to mesh with each other, and by then relatively rotating the rotary tool and the gear. The gear matching device includes workpiece holding means and rotational phase detecting means. The workpiece holding means is supported to be movable in the axial direction of the gear, and presses the gear against workpiece rotating means so as to rotatably hold the gear. The workpiece rotating means rotates the gear about the axis thereof. The rotational phase detecting means is provided to the workpiece holding means, and faces the gear to detect the rotational phase thereof when the workpiece holding means holds the gear. Accordingly, it is possible to detect the rotational phase by using the rotational phase detecting means, while the work holding means holds the gear. As a result, time taken for the gear matching can be shortened.

According to the second invention, in the gear matching device according to the first invention, the rotational phase detecting means is disposed on the opposite side of the gear to the rotary tool. Accordingly, since the rotational phase detecting means does not interfere with the gear matching operation of the rotary tool, the operation of the rotational phase detecting means can be simplified. Concurrently, since chips of the gear are not attached to the rotational phase detecting means, the rotational phase detecting means can be prevented from being damaged.

According to the third invention, the gear matching device according to the first invention further includes withdrawing means which withdraws the rotational phase detecting means from the detecting position where the rotational phase detecting means detects the rotational phase of the gear. Accordingly, the rotational phase detecting means does not interfere with the gear matching operation of the rotary tool. This makes it possible to simplify the operation of the rotational phase detecting means. Concurrently, since chips of the gear can be prevented from being attached to the rotational phase detecting means, it is possible to prevent the rotational phase detecting means from being damaged.

According to the fourth invention, the gear matching device according to any one of the first to third inventions further includes machining error absorbing means which absorbs a machining error in the axial direction of the gear when the workpiece holding means holds the gear. This makes it possible to dispose the rotational phase detecting means at a fixed position even when the workpiece holding means holds the gear having a machining error in the axial direction of the gear. As a result, the rotational phase can be detected with a high accuracy.

The gear machining apparatus according to the fifth invention includes the gear matching device according to any one of the first to fourth inventions. Specifically, the gear machining apparatus includes the gear matching device which performs gear matching so as to establish a rotational phase relationship between a rotary tool and a gear in which the rotary tool and the gear can mesh with each other, before gear machining is performed by causing the rotary tool and the gear to mesh with each other, and by then relatively rotating the rotary tool and the gear. The gear matching device also includes workpiece holding means and rotational phase detecting means. The workpiece holding means is supported to be movable in the axial direction of the gear. The workpiece holding means presses the gear against workpiece rotating means so as to rotatably hold the gear. The workpiece rotating means rotates the gear about the axis thereof. The rotational phase detecting means is provided to the workpiece holding means. The rotational phase detecting means faces the gear to detect the rotational phase thereof, when the workpiece holding means holds the gear. In addition, the rotational phase detecting means is disposed on the opposite side of the gear to the rotary tool. Moreover, the gear matching device includes withdrawing means which withdraws the rotational phase detecting means from a detecting position where the rotational phase detecting means detects the rotational phase of the gear. Furthermore, the gear matching device includes machining error absorbing means which absorbs a machining error in the axial direction of the gear when the workpiece holding means holds the gear. This makes it possible to detect the rotational phase by using the rotational phase detecting means, while the work holding means holds the gear. Accordingly, time taken for the gear matching can be shortened. In addition, since the rotational phase detecting means does not interfere with the gear matching operation of the rotary tool, the operation of the rotational phase detecting means can be simplified. Concurrently, since chips of the gear are not attached to the rotational phase detecting means, the rotational phase detecting means can be prevented from being damaged. Furthermore, since the rotational phase detecting means can be disposed at a fixed position even when the workpiece holding means holds the gear having a machining error in the axial direction of the gear, the rotational phase can be detected with a high accuracy.

DETAILED DESCRIPTION OF THE INVENTION

Hereinafter, a gear matching device according to the present invention will be described in detail with reference to the drawings.

Embodiment 1

Figure 1:
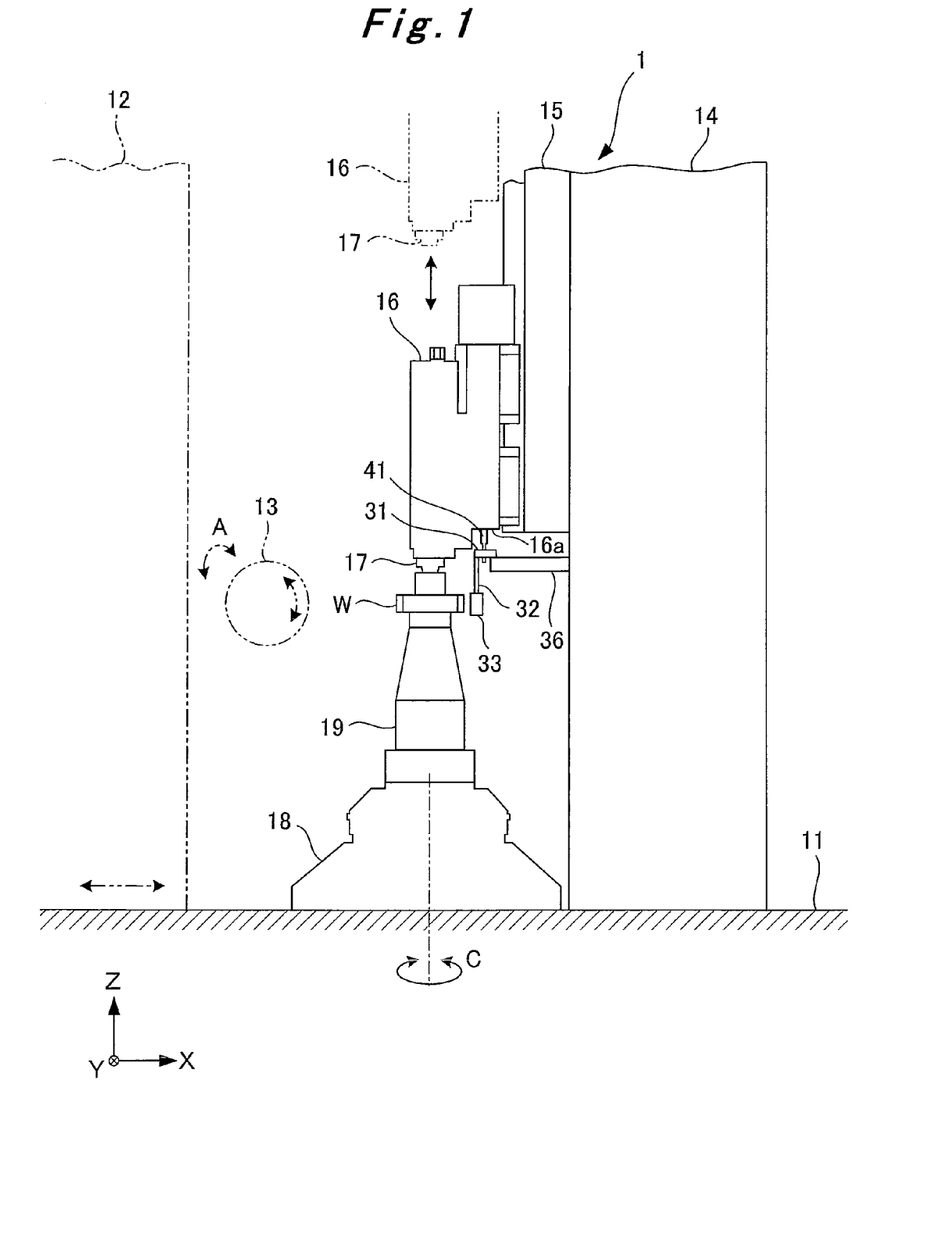
FIG. 1 shows a side view of chief part of a gear grinder including a gear matching device according to a first embodiment of the present invention.
Figure 2:
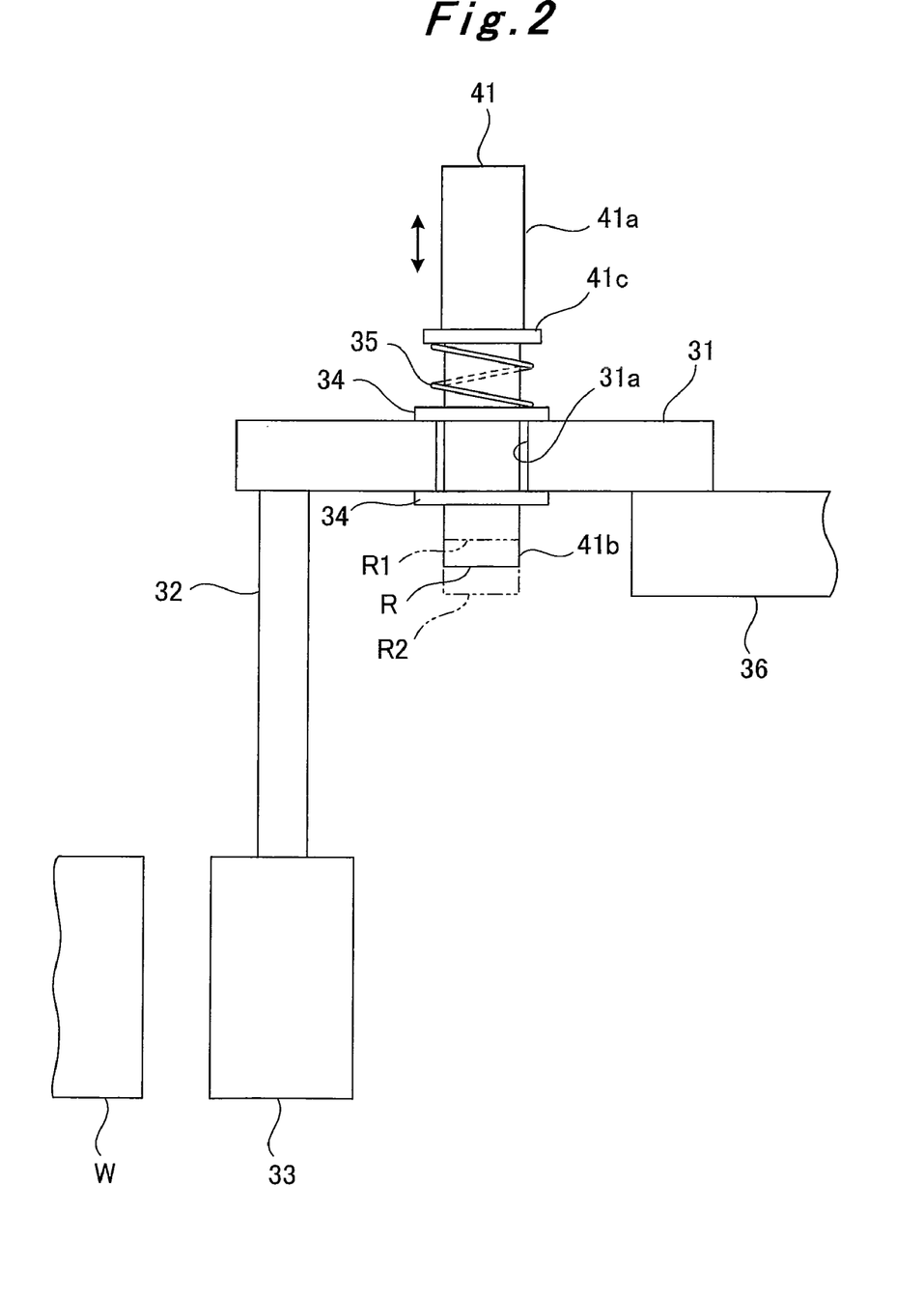
FIG. 2 shows a schematic view of an attachment structure of a sensor.
Figure 3:
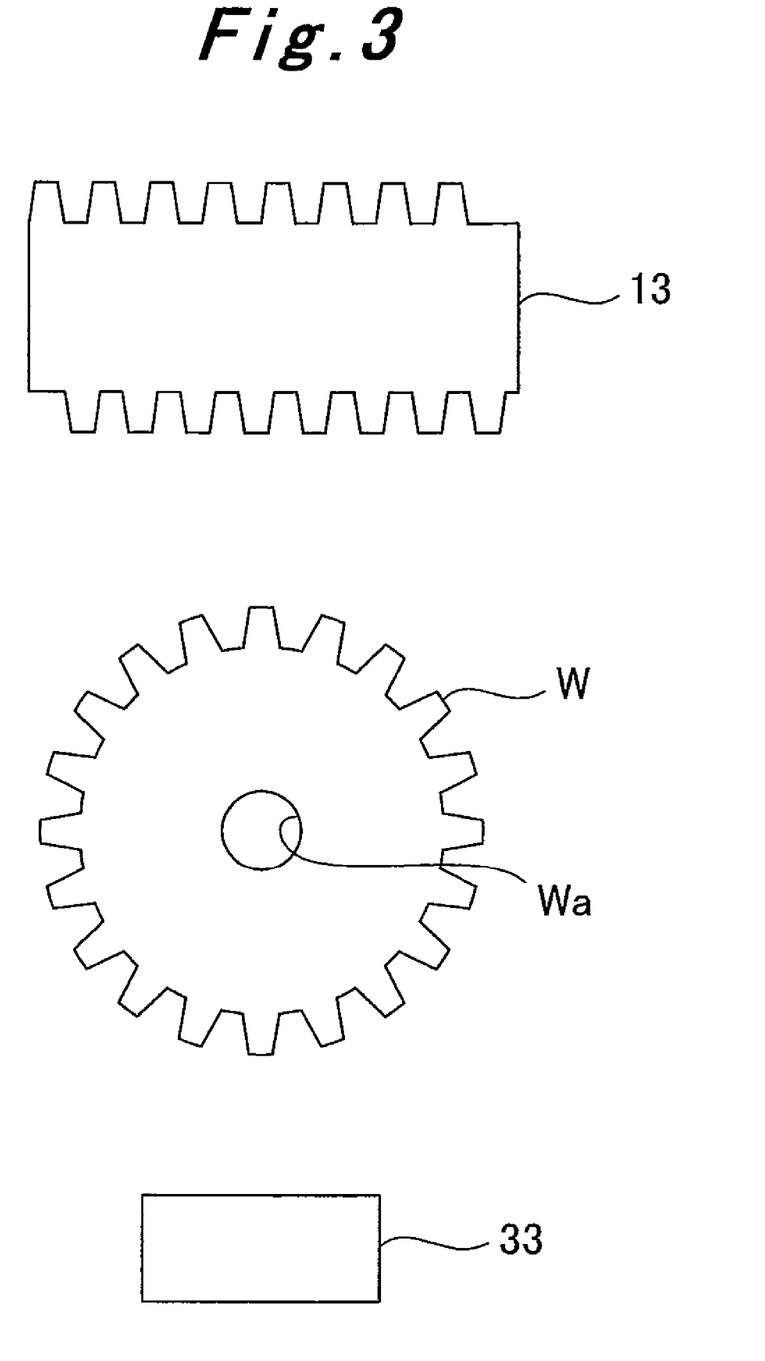
FIG. 3 shows a positional relation of a grindstone and the sensor with respect to a workpiece.

FIG. 1 shows a side view of chief part of a gear grinder including a gear matching device according to a first embodiment of the present invention. FIG. 2 shows a schematic view of an attachment structure of a sensor. FIG. 3 shows a positional relation of a grindstone and the sensor with respect to a workpiece.

As shown in FIG. 1, a column 12 is supported on a bed 11 of a gear grinder 1 that is a gear machining apparatus. The column 12 can be moved in the X-axis direction (the horizontal direction). A grindstone (rotary tool) 13 is supported on a front face of the column 12 so as to be rotatable about the horizontal axis. The grindstone 13 has a cylindrical shape, and a helical thread is formed on the outer peripheral surface of the grindstone 13. In addition, the grindstone 13 is supported to be movable in the Y-axis direction (the horizontal direction) and in the Z-axis direction (the vertical direction) with respect to the column 12, and concurrently to be revolvable in the A direction. The grindstone 13 is caused to mesh with a gear-shaped workpiece (gear to be machined) W, which will be described later, so that the gear grinding is carried out.

Moreover, a counter column 14 stands on the bed 11 to face the front face of the column 12. A guide member 15 is attached to a front face, facing the column 12, of the counter column 14. A tail stock 16 is supported on the guide member 15 to ascend and descend in the Z-axis direction. In addition, a tail stock center 17 having a substantially conical shape is supported on the lower end of the tail stock 16 to be rotatable about the vertical axis with respect to the tail stock 16.

Below the tail stock 16, a discoidal rotary table (workpiece rotating means) 18 is supported on the bed 11 to be rotatable in the C direction (about the vertical axis). An attachment jig 19 having a substantially conical shape is detachably supported on the upper portion of the rotary table 18. Moreover, the workpiece W may be attached to, and detached from, the upper portion of the attachment jig 19.

Note that, the center axis of the tail stock center 17, the center axis of the rotary table 18, and the center axis of the attachment jig 19 are arranged on the same axis. This arrangement makes it possible to hold the workpiece W in the following manner. When the tail stock 16 is lowered toward the workpiece W loaded on the attachment jig 23, the tail stock center 17 is fitted into a center hole Wa (see FIG. 3) of the workpiece W, so that the workpiece W is held. Then, by rotating the rotary table 18, the workpiece W thus held can be rotated in the C direction along with the tail stock center 17 and the attachment jig 19.

As shown in FIGS. 1 to 3, a step portion 16a is formed in a part, on the counter column 14 (the guide member 15) side, of the tail stock 16. A rod 41 is attached, at the upper end thereof, to the step portion 16a of the tail stock 16. A sensor (rotational phase detecting means) 33 is supported on the lower end of the rod 41 with a supporting plate 31 and a supporting rod 32 in between. The sensor 33 is a non-contact sensor, such as a proximity sensor, for detecting the rotational phase of the workpiece W.

A through hole 31a is formed in the supporting plate 31, and ring members 34 are provided respectively on the upper and lower portions of the through hole 31a. On the other hand, the rod 41 includes a large-diameter portion 41a, a small-diameter portion 41b, and a flange portion 41c. The large-diameter portion 41a is formed on the upper end side of the rod 41, while the small-diameter portion 41b is formed on the lower end side thereof to have a diameter smaller than that of the large-diameter portion 41a. The flange portion 41c is formed between the large-diameter portion 41a and the small-diameter portion 41b.

The small-diameter portion 41b of the rod 41 penetrates the ring members 34 and the through hole 31a of the supporting plate 31 so as to be slidably supported therein. A spring 35 is disposed in a contracted state on the outer side of the small-diameter portion 41b, at a position between the flange portion 41c of the rod 41 and the ring member 34 on the upper side. Accordingly, the supporting plate 31 is biased downward with respect to the rod 41 by the biasing force of the spring 35. Moreover, the sensor 33 is supported on one end of the supporting plate 31 with the above-described supporting rod 32 in between. On the other hand, a stopper 36 is disposed on the lower side of the other end of the supporting plate 31 while being supported on a lower portion of the front face of the counter column 14.

When the tail stock 16 is lowered, the supporting plate 31 provided to the tail stock 16 is caused to abut on the stopper 36. The lower limit of the position of the tail stock 16 is thus set in this manner. As a result, the lower end of the rod 41 (the small-diameter portion 41b) is disposed at a descending reference position R, while the sensor 33 is disposed to face the held workpiece W.

Here, the movement of the column 12 in the X-axis direction; the movement of the grindstone 13 in the Y- and Z-axis directions as well as the swing and rotational drive thereof in the A direction; the ascending and descending of the tale stock 16 in the Z-axis direction; the rotational drive of the table 18 (the workpiece W) in the C direction; the detection of the rotational phase by the sensor 33; and the like are controlled by an unillustrated NC (numerical control) device. In other words, the controlling of these operations makes it possible to perform the grinding on the workpiece W.

It should be noted that the supporting plate 31, the supporting rod 32, the spring 35, the stopper 36, the rod 41, and the like constitute machining error absorbing means.

Next, the gear matching operation and the grinding in the gear grinder 1 will be described.

Firstly, the workpiece W is loaded onto the attachment jig 19, and then the tail stock 16 is lowered. The lowering of the tail stock 16 causes the supporting plate 31 to abut on the stopper 36, so that the tail stock 16 is disposed at the lower limit position. As a result, the tail stock center 17 is fitted into a center hole Wa of the workpiece W so as to hold the workpiece W, and concurrently the sensor 33 is disposed at the detecting position where the sensor 33 faces the workpiece W thus held.

Then, the rotary table 18 is rotated in a state where the sensor 33 is disposed at the detecting position, and the position of a first tooth tip (crest) of the workpiece W is measured. Thereafter, the rotary table 18 is rotated in the opposite direction, and the position of a second tooth tip next to the first tooth tip is measured. On the basis of the results of these measurements, the rotational phase in the C direction between these first and second tooth tips is detected. Next, the NC device is caused to calculate the rotational phase in the C direction in a first tooth space (trough) between the first and second tooth tips of the workpiece W, from the detected rotational phase in the C direction between these tooth tips.

Subsequently, the rotational phase in the C direction in a second tooth space, on the grindstone 13 side, of the workpiece W is calculated from: the calculated rotational phase in the C direction in the first tooth space, facing the sensor 33, of the workpiece W; the specifications (the number of teeth, the helix angle, and the like) of the workpiece W; the detection height of the sensor 33 for the workpiece W; the sensor angle (the relative rotational angle in the C direction from the grindstone 13 side), and the like. Then, the amount of offset of the calculated rotational phase in the C direction in the tooth space, on the grindstone 13 side, of the workpiece W with respect to the grindstone 13 is obtained. The workpiece W is rotated for correction by the amount of offset of the rotational phase, so that the gear matching of the grindstone 13 with the workpiece W is carried out.

Thereafter, the rotation of the grindstone 13 is synchronized with the rotation of the rotary table 18 in the C direction. At the same time, the column 12 is moved in the X-axis direction, while the grindstone 13 is moved in the Y- and Z-axis directions as well as being rotated in the A direction. As a result, the grindstone 13 is caused to mesh with the workpiece W, so that the grinding is performed on the workpiece W.

In this event, a minute machining error sometimes occurs in the workpiece W. Suppose a case where a workpiece is rotated in the C direction about the vertical axis to be ground as described above. In this case, when a machining error occurs in the height dimension, that is, in the face width, of the workpiece, a variation occurs in the detecting position of the sensor in the Z-axis direction. As a result, the position cannot be detected with a high accuracy.

In this respect, in the gear matching device according to the present invention, the spring 35 is disposed between the supporting plate 31 and the rod 41. The spring 35 allows the sensor 33 to be disposed always at the same position in the Z-axis direction even when a machining error occurs in the height direction of the workpiece W.

Specifically, as shown in FIG. 2, when the height dimension of the workpiece W is larger than a predetermined dimension, the lower limit position of the tail stock 16 is changed, by the increase in the height dimension, slightly upward of a position at the time when a workpiece is machined to have the predetermined dimension. In accordance with this change, the lower end of the rod 41 is lowered only to an upper reference position R1 positioned above the descending reference position R. However, since the supporting plate 31 is biased downward with respect to the rod 41 by the biasing force of the spring 35, the supporting plate 31 abuts on the stopper 36. Accordingly, even when the height dimension of the workpiece W is larger than the predetermined dimension, the sensor 33 is disposed at the same position in the Z-axis direction as that in the case where a workpiece is machined to have a height dimension equivalent to the predetermined dimension.

On the other hand, when the height dimension of the workpiece W is smaller than the predetermined dimension, the lower limit position of the tail stock 16 is changed, by the decrease in the height dimension, slightly downward of the position at the time when a workpiece is machined to have the predetermined dimension. At this time, the supporting plate 31 abuts on the stopper 36, and concurrently the lower end of the rod 41 is lowered, against the biasing force of the spring 35, to a lower reference position R2 positioned below the descending reference position R. In other words, the lowering of the supporting plate 31 is restricted by the stopper 36, but only the rod 41 is lowered. Accordingly, even when the height dimension of the workpiece W is smaller than the predetermined dimension, the sensor 33 is disposed at the same position in the Z-axis direction as that in the case where a workpiece is machined to have a height dimension equivalent to the predetermined dimension.

Accordingly, since the spring 35 disposed between the supporting plate 31 and the rod 41 absorbs the machining error in the height dimension of the workpiece W, the detecting position of the sensor 33 can be kept constant in the Z-axis direction.

In addition, since the sensor 33 is supported on the tail stock 16, it is unnecessary to withdraw the grindstone 13 even during the detection by the sensor 33, when the gear matching operation is carried out. As a result, time taken for the gear matching operation can be shortened. Moreover, as shown in FIG. 3, the sensor 33 is provided on the opposite side of the workpiece W to the grindstone 13. With this structure, the distance from the grindstone 13 to the sensor 33 can be made longer. As a result, the sensor 33 is prevented from being damaged by chips of the workpiece W, or by the feeding and splashing of a coolant, at the time of grinding.

Accordingly, the supporting of the sensor 33 on the tail stock 16 makes it possible to detect the rotational phase of the workpiece W by using the sensor 33 while causing the tail stock 16 to hold the workpiece W. As a result, the time taken for the gear matching can be shortened.

Moreover, since the sensor 33 is disposed on the opposite side of the workpiece W to the grindstone 13, the sensor 33 does not interfere with the gear matching operation of the grindstone 13. This makes it possible to simplify the operation, and to thus further shorten the time taken for the gear matching. Additionally, since the distance from the grindstone 13 to the sensor 33 can be kept sufficient, it is possible to prevent the sensor 33 from being damaged by chips of the workpiece W, or by the feeding and splashing of the coolant, at the time of grinding.

Furthermore, the disposing of the spring 35 between the supporting plate 31 and the rod 41 provides the following effect. Specifically, even when a machining error occurs in the height dimension of the workpiece W, it is possible to absorb the machining error. Accordingly, the sensor 33 can be disposed constantly at the same detecting position. As a result, the rotational phase can be detected with a high accuracy.

Embodiment 2

Figure 4:
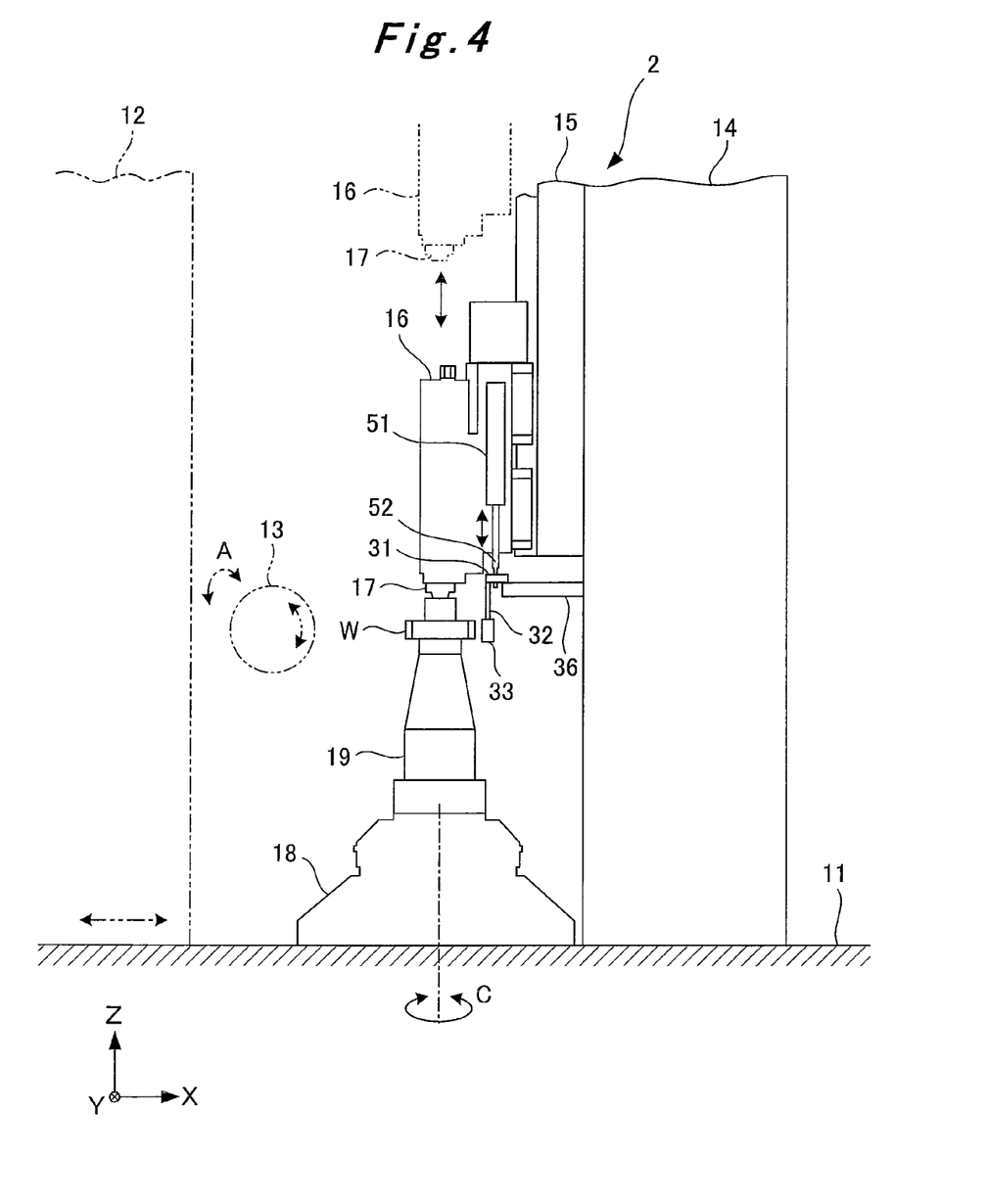
FIG. 4 shows a side view of chief part of a gear grinder including a gear matching device according to a second embodiment of the present invention.
Figure 5:
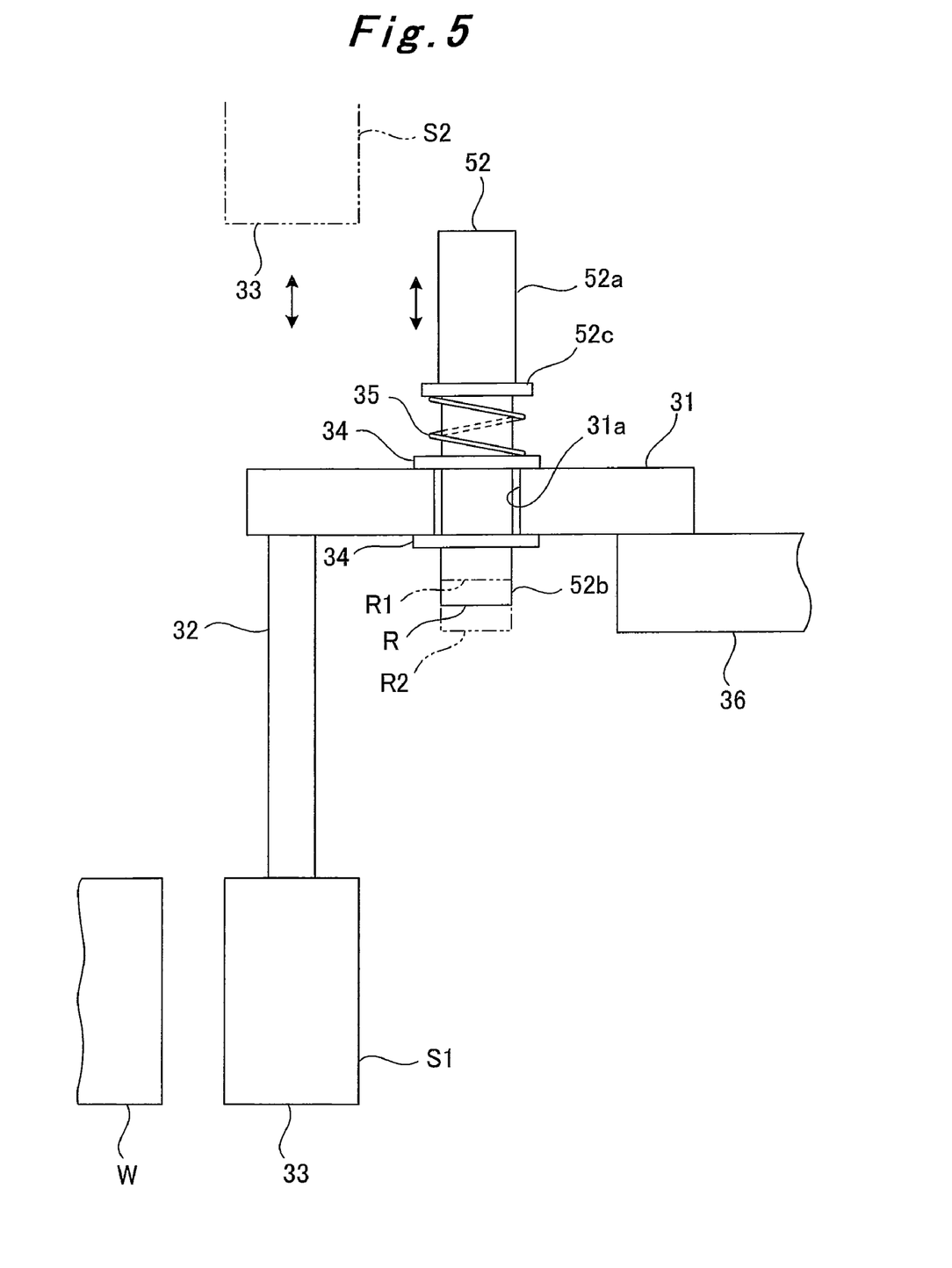
FIG. 5 shows a schematic view of an attachment structure of a sensor.
Figure 6:
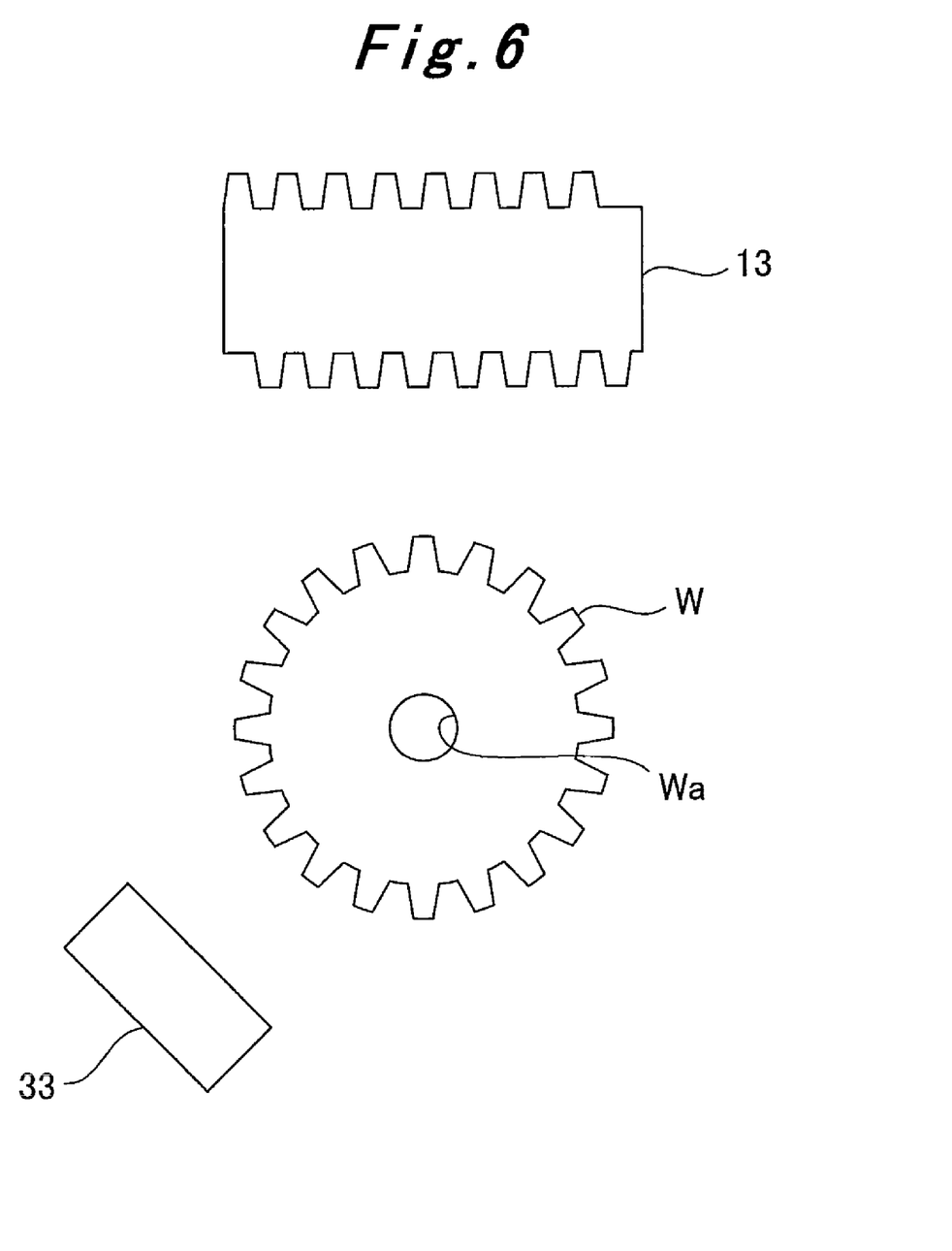
FIG. 6 shows a positional relation of a grindstone and the sensor with respect to a workpiece.

FIG. 4 shows a side view of chief part of a gear grinder including a gear matching device according to a second embodiment of the present invention. FIG. 5 shows a schematic view of an attachment structure of a sensor. FIG. 6 shows a positional relation of a grindstone and the sensor with respect to a workpiece. Note that, in the following descriptions, components having the same structures and functions as those described in the first embodiment will be denoted by the same reference numerals, and the same descriptions as those made in the first embodiment will be omitted.

As shown in FIGS. 4 to 6, a cylinder 51 is provided on the side face of the tail stock 16 in a gear grinder 2, which is a gear machining apparatus. The cylinder 51 is provided with a rod 52 that slides in the Z-axis direction. The sensor 33 is supported on the lower end of the rod 52 with the supporting plate 31 and the supporting rod 32 in between.

The rod 52 includes a large-diameter portion 52a, a small-diameter portion 52b, and a flange portion 52c. The large-diameter portion 52a is formed on the upper end side of the rod 52, while the small-diameter portion 52b is formed on the lower end side thereof to have a diameter smaller than that of the large-diameter portion 52a. The flange portion 52c is formed between the large-diameter portion 52a and the small-diameter portion 52b.

The small-diameter portion 52b of the rod 52 penetrates the ring members 34 and the through hole 31a of the supporting plate 31 so as to be slidably supported therein. The spring 35 is disposed in a contracted state on the outer side of the small-diameter portion 52b, at a position between the flange portion 52c of the rod 52 and the ring member 34 on the upper side. Accordingly, the supporting plate 31 is biased downward with respect to the rod 52 by the biasing force of the spring 35.

Specifically, when the tail stock 16 is lowered, the supporting plate 31 provided to the tail stock 16 is caused to abut on the stopper 36. The lower limit of the position of the tail stock 16 is thus set in this manner. As a result, the lower end of the rod 52 (the small-diameter portion 52b) is disposed at the descending reference position R, while the sensor 33 is disposed to face the held workpiece W. When the tail stock 16 is disposed at the lower limit position, the sensor 33 is moved between a detecting position S1 and a withdrawal position S2 by driving the cylinder 51 to expand and contract the rod 52.

Here, the movement of the column 12 in the X-axis direction; the movement of the grindstone 13 in the Y- and Z-axis directions as well as the swing and rotational drive thereof in the A direction; the ascending and descending of the tail stock 16 in the Z-axis direction; the rotational drive of the table 18 (the workpiece W) in the C direction; the detection of the rotational phase by the sensor 33; the drive of the cylinder 51; and the like are controlled by an unillustrated NC device. In other words, the controlling of these operations makes it possible to perform the grinding on the workpiece W.

It should be noted that the supporting plate 31, the supporting rod 32, the spring 35, the stopper 36, the cylinder 51, the rod 52, and the like constitute machining error absorbing means.

Next, the gear matching operation and the grinding in the gear grinder 1 will be described.

Firstly, the workpiece W is loaded onto the attachment jig 19, and then the tail stock 16 is lowered in a state where the rod 52 of the cylinder 51 is extended. The lowering of the tail stock 16 causes the supporting plate 31 to abut on the stopper 36, so that the tail stock 16 is disposed at the lower limit position. As a result, the tail stock center 17 is fitted into the center hole Wa of the workpiece W so as to hold the workpiece W, and concurrently the sensor 33 is disposed at the detecting position S1 where the sensor 33 faces the workpiece W thus held.

Then, the rotary table 18 is rotated in a state where the sensor 33 is disposed at the detecting position S1, and the position of a first tooth tip (crest) of the workpiece W is measured. Thereafter, the rotary table 18 is rotated in the opposite direction, and the position of a second tooth tip next to the first tooth tip is measured. On the basis of the results of these measurements, the rotational phase in the C direction between these first and second tooth tips is detected. Next, the NC device is caused to calculate the rotational phase in the C direction in a tooth space (trough) between the first and second tooth tips of the workpiece W, from the detected rotational phase in the C direction between these tooth tips.

Subsequently, the rotational phase in the C direction in a tooth space, on the grindstone 13 side, of the workpiece W is calculated from: the calculated rotational phase in the C direction in the tooth space, facing the sensor 33, of the workpiece W; the specifications (the number of teeth, the helix angle, and the like) of the workpiece W; the detection height of the sensor 33 for the workpiece W; the sensor angle (the relative rotational angle in the C direction from the grindstone 13 side), and the like. Then, the amount of offset of the calculated rotational phase in the tooth space, on the grindstone 13 side, of the workpiece W with respect to the grindstone 13 is obtained. The workpiece W is rotated for correction by the amount of offset of the rotational phase, so that the gear matching of the grindstone 13 with the workpiece W is carried out.

Thereafter, the sensor 33 is raised from the detecting position S1 to the withdrawal position S2 by driving the cylinder 51 to contract the rod 52. Then, the rotation of the grindstone 13 is synchronized with the rotation of the rotary table 18 in the C direction. At the same time, the column 12 is moved in the X-axis direction, while the grindstone 13 is moved in the Y- and Z-axis directions as well as being rotated in the A direction. As a result, the grindstone 13 is caused to mesh with the workpiece W, so that the grinding is performed on the workpiece W.

In this event, a minute machining error sometimes occurs in the workpiece. In the case where the workpiece is rotated in the C direction about the vertical axis to be ground as described above, when a machining error occurs in the height dimension, that is, in the face width, of the workpiece, a variation occurs in the detecting position S1 of the sensor in the Z-axis direction. As a result, the position cannot be detected with a high accuracy.

In this respect, in the gear matching device according to the present invention, the spring 35 is disposed between the supporting plate 31 and the rod 52. The spring 35 allows the sensor 33 to be disposed always at the same position in the Z-axis direction even when a machining error occurs in the height direction of the workpiece W.

Specifically, as shown in FIG. 5, when the height dimension of the workpiece W is larger than a predetermined dimension, the lower limit position of the tail stock 16 is changed, by the increase in the dimension, slightly upward of a position at the time when a workpiece is machined to have the predetermined dimension. In accordance with this change, the lower end of the rod 52 is lowered only to an upper reference position R1 positioned above the descending reference position R. However, since the supporting plate 31 is biased downward with respect to the rod 52 by the biasing force of the spring 35, the supporting plate 31 abuts on the stopper 36. Accordingly, even when the height dimension of the workpiece W is larger than the predetermined dimension, the sensor 33 is disposed at the same position in the Z-axis direction as that in the case where a workpiece is machined to have a height dimension equivalent to the predetermined dimension.

On the other hand, when the height dimension of the workpiece W is smaller than the predetermined dimension, the lower limit position of the tail stock 16 is changed, by the decrease in the dimension, slightly downward of the position at the time when a workpiece is machined to have the predetermined dimension. At this time, the supporting plate 31 abuts on the stopper 36, and concurrently the lower end of the rod 52 is lowered, against the biasing force of the spring 35, to a lower reference position R2 positioned below the descending reference position R. In other words, the lowering of the supporting plate 31 is restricted by the stopper 36, but only the rod 52 is lowered. Accordingly, even when the height dimension of the workpiece W is smaller than the predetermined dimension, the sensor 33 is disposed at the same position in the Z-axis direction as that in the case where a workpiece is machined to have a height dimension equivalent to the predetermined dimension.

Accordingly, since the spring 35 disposed between the supporting plate 31 and the rod 52 absorbs a machining error in the height dimension of the workpiece W, the detecting position S1 of the sensor 33 can be kept constant in the Z-axis direction.

In addition, since the sensor 33 is supported on the tail stock 16, it is unnecessary to withdraw the grindstone 13 even during the detection by the sensor 33, when the gear matching operation is carried out. As a result, time taken for the gear matching operation can be shortened. Moreover, since the sensor 33 having completed the detection of rotational phase is raised to the withdrawal position S2, the distance from the grindstone 13 to the sensor 33 can be made longer. As a result, the sensor 33 is prevented from being damaged by chips of the workpiece W, or by the feeding and splashing of a coolant, at the time of grinding.

Note that, in the above-described operation, the sensor 33 is disposed at the detecting position S1 by lowering the tail stock 16 in a state where the rod 52 of the cylinder 51 is extended. However, the sensor 33 may be lowered to the detecting position S1, after being disposed once at the withdrawal position S2 by lowering the tail stock 16 in a state where the rod 52 of the cylinder 51 is contracted. Moreover, another withdrawing mechanism for withdrawing the sensor 33 outward in the radial direction of the workpiece W may be provided in addition to the cylinder 51 and the rod 52. Alternatively, only this withdrawing mechanism may be provided.

Accordingly, the supporting of the sensor 33 on the tail stock 16 makes it possible to detect the rotational phase of the workpiece W by using the sensor 33 while the tail stock 16 is holding the workpiece W. As a result, the time taken for the gear matching can be shortened.

Moreover, since the cylinder 51 for raising and lowering the sensor 33 between the detecting position S1 and the withdrawal position S2 is provided, the sensor 33 is disposed at the withdrawal position S2 while not detecting the rotational phase, that is, during the gear matching and the grinding.

Accordingly, since the sensor 33 does not interfere with the gear matching operation of the grindstone 13, it is possible to simplify the operation, and to thus further shorten the time taken for the gear matching. Additionally, since the distance from the grindstone 13 to the sensor 33 can be kept sufficient, it is possible to prevent the sensor 33 from being damaged by chips of the workpiece W, or by the feeding and splashing of the coolant, at the time of grinding.

Furthermore, since the disposing of the spring 35 between the supporting plate 31 and the rod 52 of the cylinder 51 provides the following effect. Specifically, even when a machining error occurs in the height dimension of the workpiece W, it is possible to absorb the machining error. Accordingly, the sensor 33 can be disposed constantly at the detecting position. As a result, the rotational phase can be detected with a high accuracy.

It should be noted that, although being provided between the supporting plate 31 and the rod 41 or 52 in the above-described embodiments, the spring 35 may not necessarily be provided. Alternatively, the lower end of the rod 41 or 52 may be fixed to the supporting plate 31. Moreover, in the above-described embodiments, the gear matching device according to the present invention is employed to the gear grinder for grinding a gear-shaped workpiece by using the screw-shaped grindstone. However, the gear matching device according to the present invention may be employed to a gear machining apparatus, such as a hobbing machine which machines a gear-shaped workpiece by using a screw-shaped hob cutter.

INDUSTRIAL APPLICABILITY

The present invention may be applied to a gear machining apparatus, such as a gear grinder, in which a tooth profile error and a tooth trace error occurring in a gear to be machined can be accurately corrected.

The invention claimed is:

1. A gear matching device which performs gear matching so as to establish a rotational phase relationship between a rotary tool and a gear to be machined in which the rotary tool and the gear can mesh with each other, before gear machining is performed by causing the rotary tool and the gear to mesh with each other, and by then relatively rotating the rotary tool and the gear, the gear matching device comprising:
    a rotary table which rotates the gear about an axis thereof;
    a tail stock which is supported to be movable in the axial direction of the gear, and by which the gear is held between a tail stock center and the rotary table, the tail stock center being rotatably supported on a lower end of the tail stock;
    a sensor which is provided to the tail stock, and which faces the gear to detect the rotational phase thereof, when the tail stock holds the gear between the tail stock center and the rotary table;
    a rod which is provided to the tail stock, and which supports the sensor with a supporting plate in between;
    a stopper which is caused to abut on the supporting plate when the tail stock is moved toward the rotary table; and
    a spring which is provided in a contracted state between the supporting plate and the rod to thereby bias the supporting plate downward with respect to the rod, and absorbs a machining error in the axial direction of the gear to thereby keep the detection position of the sensor constant in the axial direction of the gear when the gear is held between the tail stock and the rotary table.

2. The gear matching device according to claim 1, wherein the sensor is disposed on the opposite side of the gear to the rotary tool.

3. A gear machining apparatus, comprising:
    the gear matching device according to claim 2.

4. The gear matching device according to claim 1, further comprising:
    a cylinder which is provided to the tail stock, and which raises and lowers the sensor between a detecting position where the sensor detects the rotational phase of the gear and a withdrawal position where the sensor is withdrawn upward from the detecting position.

5. A gear machining apparatus, comprising:
    the gear matching device according to claim 4.

6. A gear machining apparatus, comprising:
    the gear matching device according to claim 1.

* * * * *